United States Patent [19]

Kochanneck

[11] 4,232,988
[45] Nov. 11, 1980

[54] ARTICLE STORAGE AND RETRIEVAL SYSTEM

[76] Inventor: Uwe Kochanneck, Neuer Graben 81, 46 Dortmund, Fed. Rep. of Germany

[21] Appl. No.: 898,313

[22] Filed: Apr. 19, 1978

Related U.S. Application Data

[63] Continuation of Ser. No. 680,876, Apr. 27, 1976, abandoned.

[30] Foreign Application Priority Data

May 3, 1975 [DE] Fed. Rep. of Germany ....... 2519864

[51] Int. Cl.$^3$ ....................... B65G 1/133; A47B 49/00
[52] U.S. Cl. .................................... 414/331; 312/202; 312/266; 414/263; 414/273; 414/281; 414/409
[58] Field of Search ....................... 312/339, 202, 266; 108/103, 104, 20, 21; 211/1.5; 414/233, 258–260, 263, 280, 278, 281, 273, 331, 409

[56] References Cited

U.S. PATENT DOCUMENTS

| 488,594 | 12/1892 | Yost | 108/103 |
|---|---|---|---|
| 1,327,771 | 1/1920 | Ogden | 108/103 |
| 2,779,484 | 1/1957 | Schramm | 414/233 |
| 3,382,990 | 5/1968 | Salloum | 414/233 |
| 3,613,909 | 10/1971 | Salloum | 414/260 |
| 4,023,687 | 5/1977 | Salloum | 414/276 |

FOREIGN PATENT DOCUMENTS

| 2031442 | 12/1971 | Fed. Rep. of Germany | 214/16.1 A |
|---|---|---|---|
| 726154 | 2/1932 | France | 214/16.1 A |
| 1195126 | 11/1959 | France | 214/16.1 A |
| 1047448 | 11/1966 | United Kingdom | 214/16.1 A |

*Primary Examiner*—Stephen G. Kunin
*Assistant Examiner*—Terrance L. Siemens
*Attorney, Agent, or Firm*—Michael J. Striker

[57] ABSTRACT

Concentric annular tracks support for rotary movement a set of storage trains in the form of concentric cylindrical shelves. Each train has a vertically directed discontinuity and is driven by a separate driving unit so that the discontinuities can be aligned to form a radially directed access aisle. A stationary control member controls the driving units of the trains. In a modification, stationary storage shelves surround the trains and are equipped with conveyor for moving respective holders in vertical direction and along the circumference of each train and also radially from one train to another. Also, an elevator is provided for operation in the aisle.

4 Claims, 6 Drawing Figures

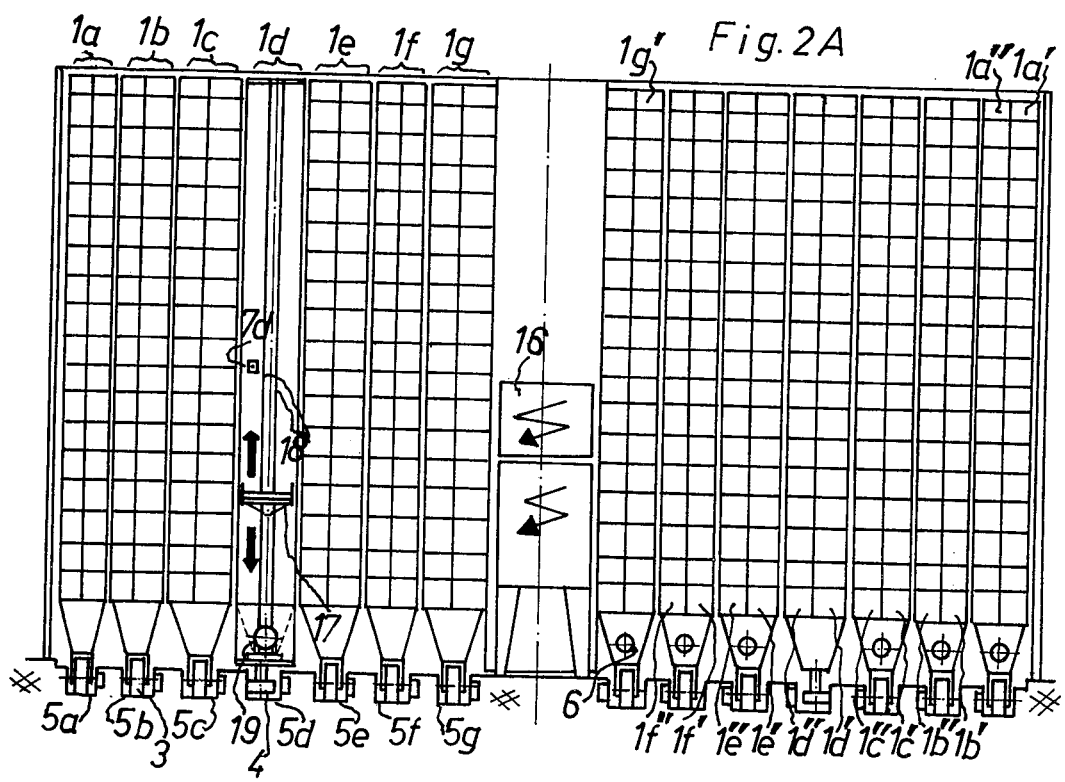
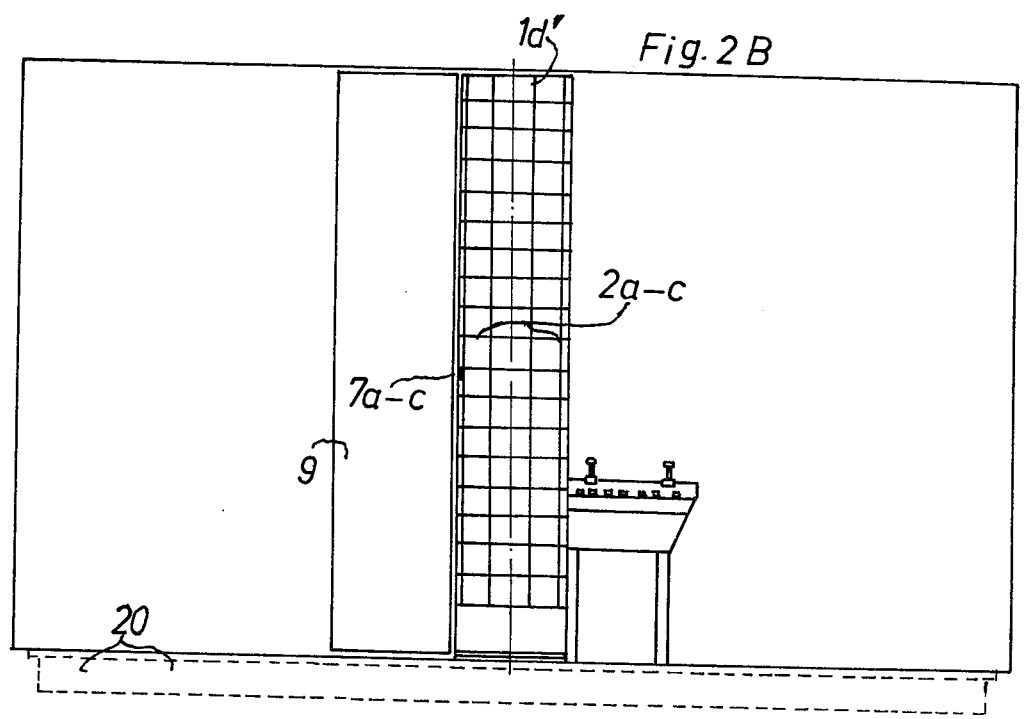

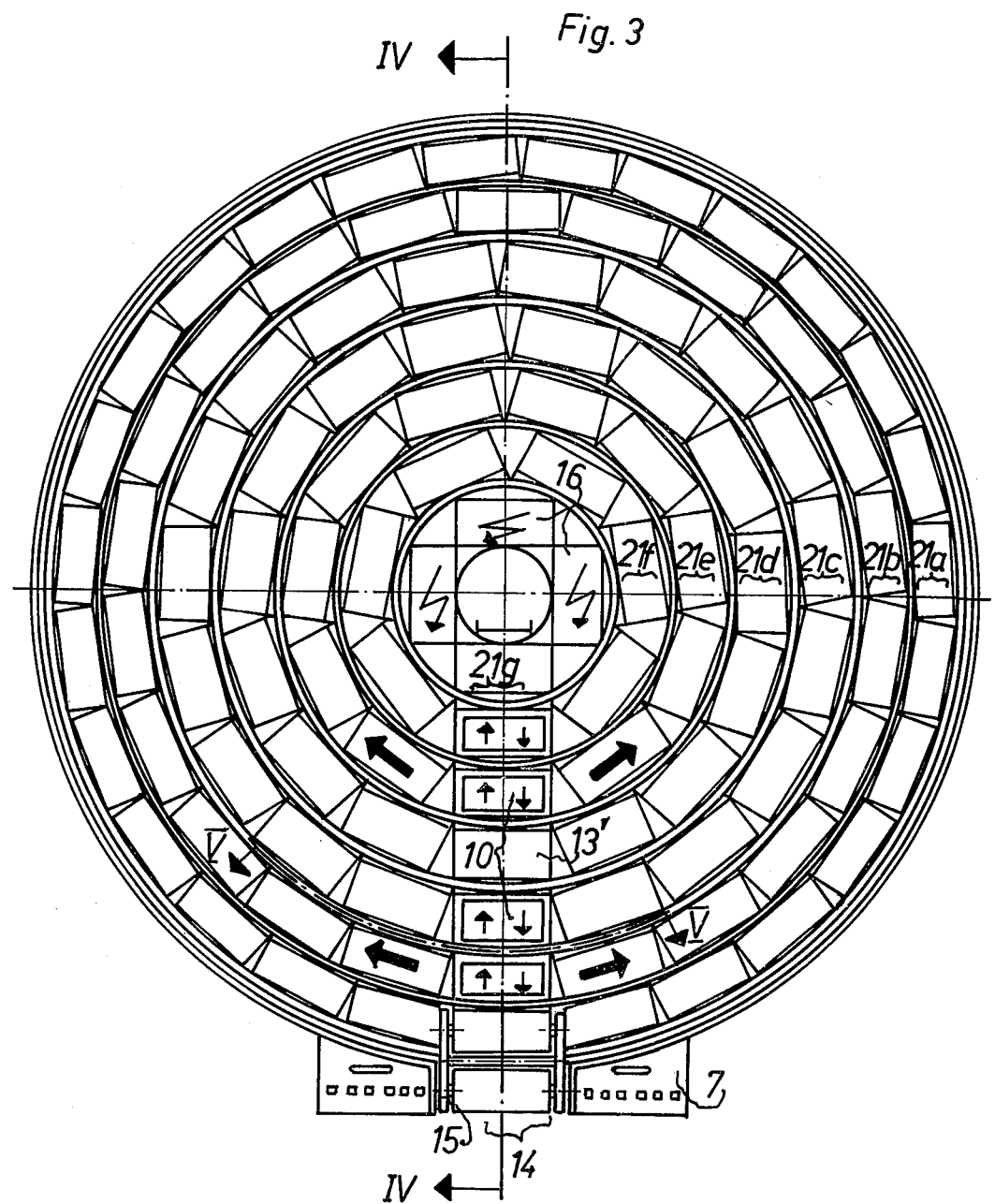

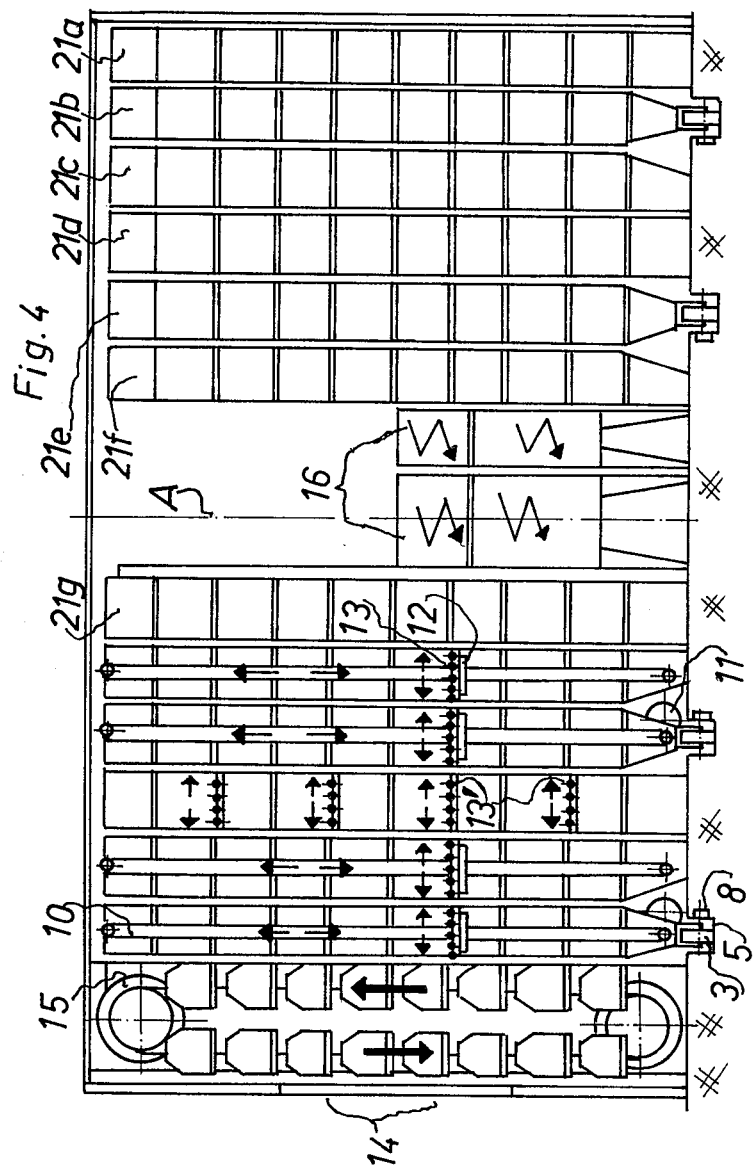

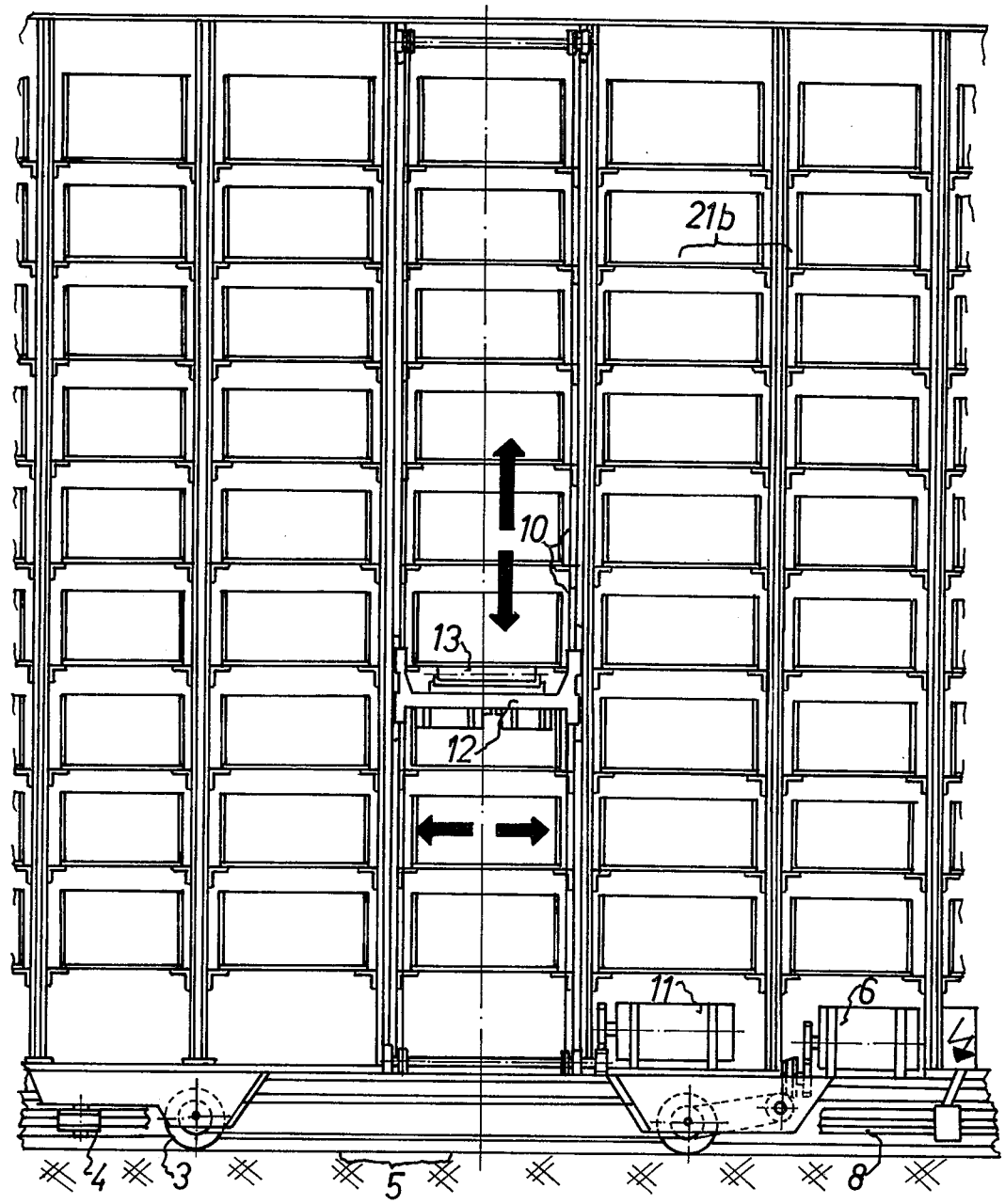

ARTICLE STORAGE AND RETRIEVAL SYSTEM

This is a continuation of application Ser. No. 680,876, filed Apr. 27, 1976, now abandoned.

BACKGROUND OF THE INVENTION

The present invention relates to a method of and system for storing and retrieving an article. More particularly this invention concerns such an arrangement wherein a multiplicity of articles can be stored in a relatively limited space and each article can be relatively easily retrieved from its space.

In a standard filing system cabinets, shelves or the like are arranged in rows each of which opens into an aisle. In order to retrieve a file or article from any of the cabinets or shelves it is simply necessary to go to the appropriate aisle and remove it from the holder at this aisle. It has been suggested in file systems to reduce the floor space by only providing enough room for a single aisle, making all of the cabinets displaceable so that it is possible to open up this aisle between any two cabinets, thereby giving access to any cabinet simply by opening up the system so that the aisle is in front of this cabinet. This arrangement is, indeed, a considerable improvement over the prior-art system which requires at least one aisle for every two sets of cabinets, but nonetheless requires the person seeking access to the cabinets to move about within the system. Furthermore it is frequently necessary to move virtually all of the cabinets of the system in order to gain access to a single article stored in the system, so that maintenance costs and service life are reduced.

It has also been suggested to mount all of the articles which are to be retrieved on an endless track adjacent which is provided an access station. Thus the person seeking access to one of the articles need merely set the train of articles in motion until the article being sought is aligned with the access station, whereupon it can be removed from the track. This system again requires displacement of every stored article each time one is sought, and nonetheless takes up considerable floor space. What is more such systems are relatively slow in that a person seeking access to a particular article must often wait for at least half of the articles to pass by before the appropriate article is aligned with the access station.

SUMMARY OF THE INVENTION

It is therefore an object of the present invention to provide an improved article storage and retrieval system and method.

Another object is the provision of such a system wherein it is possible to gain access from a single access station to a great number of holders in each of which may be provided one or more articles.

Yet another object is the provision of such a system which uses floor space more efficiently than the above-described system.

Yet another object is to provide an article storage system and apparatus which does not require the displacement of every article stored each time one of the stored articles is being retrieved or replaced in storage.

These objects are attained according to the present invention in a storing and retrieving method wherein each of the articles is held in a respective holder. A first group of the holders is arrayed in a first train in the form of a cylindrical shelf supported on and displaceable about a first annular track and having a pair of ends spaced apart by a gap. A second group of holders separate from the first group is arrayed in a second train displaceable about a second annular track to one side of the first track. One of these tracks lies within the other track. Access can be gained to the holders of the second group from a fixed station to the other side of the first track by displacing the first train into a position with its gap aligned with the station and by displacing the second train into a position with the desired holder aligned with the gap and therethrough with the station. Thus access may be had to this one holder and the article therein from the station through the gap. Furthermore access may be had to any of the holders of the second train simply by displacing the desired holder into alignment with the access station.

Thus with the system according to the present invention it is possible from an access station inside or outside a plurality of annular tracks to gain access to any of a multiplicity of holders arrayed in several trains each on a respective one of the tracks. Such a system may have, for instance, seven such tracks each of which has a respective train of holders with a gap in the train so that access can be had through each train to the train on the other side of it.

In accordance with yet another feature of this invention each train has two subgroups of holders, an inner group accessible only from the inside of the respective track and an outer subgroup only accessible from the outside of the respective track. Thus the number of addresses or locations at which the various articles can be stored is virtually doubled with a given floor space.

According to this invention the tracks are circularly concentric. The access station is provided outside the concentric array of tracks. Thus it is possible to gain access to the articles in any one of the tracks merely by displacing it and it alone into a position aligned with the aisle formed by the gaps of all of the trains. In an arrangement wherein each of the trains has an inner and outer subgroup of holder as described immediately above, the operator need merely walk down the aisle beyond the track on which the train whose inner group he wishes access to runs. Once radially inside this track a starter device, such as a simple start or enter switch, is pressed in order to displace the train on the track radially outside the operator into a position with the desired holder aligned with the aisle formed by the aligned gaps.

According to yet another feature of the present invention the holders of each subgroup are arranged in vertical columns and horizontal rows and an elevator is provided for displacing an operator vertically up and down adjacent each row of each subgroup. The elevators may be provided on tracks extending vertically along an end of each of the trains in addition to at the access station so that an operator may be raised to a position horizontally in line with the desired holder.

According to another feature of this invention a third group of the holders is arrayed in a stationary row between two tracks. This row may be formed with a gap aligned with the access station. In addition means may be provided on the trains and/or on the stationary row which can be vertically aligned into juxtaposition with a respective holder and can serve to automatically remove a holder and/or an article from an adjacent track or row. Thus the system can be set up automatically to place the articles to be stored in respective storage locations and to remove them therefrom and deliver them to the access station.

According to yet another feature of this invention a plurality of such storage systems may themselves be mounted on a single annular track so as to be displaceable past a single access station. Thus it is possible to greatly increase the number of storage locations accessible from a single access station. Such an arrangement is extremely useful in systems wherein a single person must have access to a great quantity of different articles, albeit one at a time. This is the case in a court, for instance, where a single clerk must be able readily to obtain any of a vast number of docket files, corporation registration papers, or the like.

It is noted that the system according to the present invention is equally usable for the storage of small parts, as in an electronics or auto-parts business, or to the storage of books or files. It is possible, for instance, with the system of this invention to store a great quantity of books in a relatively reduced area and to have ready access to these books which are fully protected at all times within the storage system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2A is a section taken along line IIA—IIA of FIG. 1;

FIG. 2B is a view taken in the direction of arrow IIB of FIG. 1;

FIG. 3 is a top view of another system according to this invention;

FIG. 4 is a section taken along line IV—IV of FIG. 3; and

FIG. 5 is a section taken along curved line V—V of FIG. 3.

DESCRIPTION OF THE PREFERRED EMBODIMENTS

Figure 1:
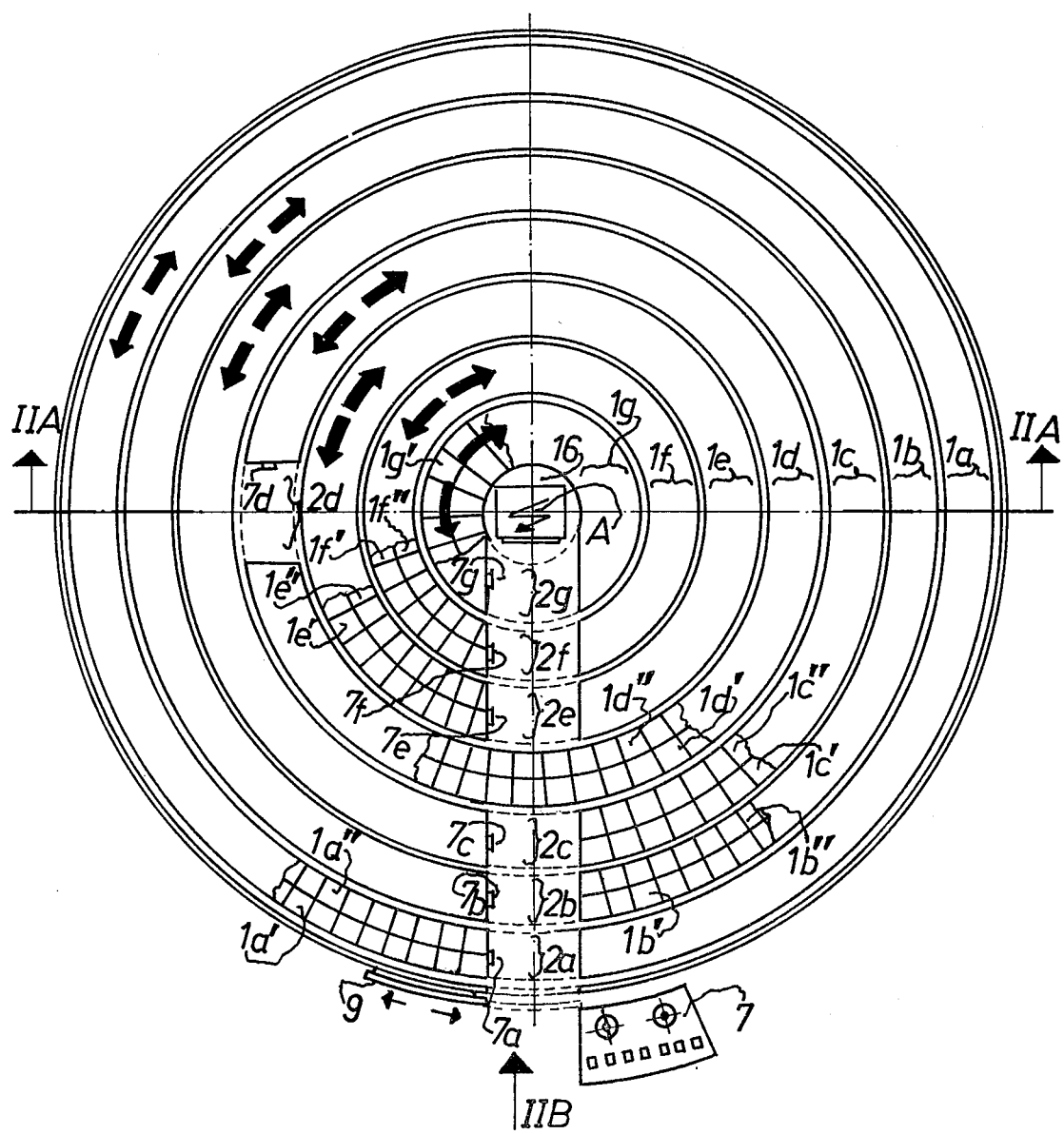
FIG. 1 is a top partly schematic view of a system according to this invention.

The arrangement shown in FIGS. 1, 2A and 2B is centered on an upright axis A and has a cylindrical horizontal foundation 20 formed with seven circular concentric grooves 5a–g constituting tracks for supporting five trains in the form of cylindrical shelves 1a–g each centered on the axis A and displaceable about the respective tracks 5a–g. Each of the trains 1a–g is supported in the respective tracks 5a–g on wheels 3 and centered in the track by means of wheels 4, the wheels 3 being pivoted about horizontal axes and the wheels 4 about vertical axes. In addition each track is provided with commutator rings 8 connected via wipers to a drive motor 6 in each of the trains 1a–g. A computer 16 provided at the very center of the arrangement at the axis A is connected through these wipers 8 to all of the motors 6 and to a panel 7 at the access station of the arrangement.

Each of the trains 1a–g supports a multiplicity of outer holders 1a'–g' accessible only from the outside relative to the axis A and a multiplicity of inner holders 1a"–g" accessible only from radially inside the respective train 1a–g. The holders 1a'–g' and 1a"–g" are arranged in vertical columns and horizontal rows, the rows having a length determined by the diameter of the respective track 5a–g. Each such holder can receive a row of books, a stack of files, a single book or file, a box of spare parts, or virtually any item that must be cataloged and kept in a particular place.

In addition each of the trains 1a–g is formed with a respective gap 2a–g that are all alignable to form an aisle giving access from the control station 7 all the way to the computer 16 at the very center of the device.

In addition each of the trains 1a–g is provided at one end with a respective start-entry switch 7a–g which is connected to the control station 7. Furthermore the end of the aisle formable by the gaps 2a–g is closable by means of a sliding door 9 so that the items in the holders can be kept secure when the arrangement is not in use.

In order to have access, for instance, to one of the holders 1d" the operator enters at the station 7 the code number for the holder 1d" he or she wants access to. Then this operator walks along the aisle formed by the gap 2a–g to the space 2e and presses the enter-start button 7e. This will cause the train 1d and only the train 1d to rotate about the axis A by means of its motor 6 until the desired holder 1d" is aligned with the gap 2e. The operator may then retrieve the article from the holder 1d" and again actuate the switch 7e. Such a second actuation of the switch 7e will operate the motor 6 of the train 1d so as again to align the gap 2d with the gaps 2a–c and 2e–g. The operator may then walk out of the storage system. The computer automatically rotates the trains 1a–g in the direction which requires the least movement to bring the respective gap or desired holder into alignment with the other gaps or station 7.

It is also possible in accordance with this invention to provide a platform 17 vertically displaceable along tracks 18 at each of the gaps 2a–g. A motor 19 underneath each platform 17 is operable so as vertically to displace the respective platform. Such an arrangement readily allows the user to be lifted up to the desired level in order most easily to retrieve an object from one of the holders. It is also possible in accordance with this invention to provide an emergency button at each station which atuomatically aligns all of the gaps with each other to prevent a person from being trapped in the device. In addition when only the approximate location of the holder being sought is known it is possible to provide other controls at each of the gaps 2a–g in order to allow a person standing in that gap to travel around with the respective train and scan the holders, seeking the correct one.

It is also possible in accordance with this invention to provide several such systems as shown in FIG. 1 suspended or displaceable along another closed endless track on the ground past a single such control station 7. In this manner from a single control station it is possible to have access not only to a set of such trains 1a–g, but to several such sets.

The arrangement in FIGS. 3–5 automatically puts any article in the selected space or retrieves it from the selected space and delivers it to the control station 7. This arrangement comprises seven sets 21a–g of holders, six of which being in the form of cylindrical shelves 21a–f of which only shelves 21b and 21e are the trains displaceable in annular tracks 5 as described above with reference to FIG. 1. The cylindrical shelves 21a, 21c, 21d, 21f and 21g are all fixed. Each of these holders is double-sided as described above with reference to FIG.

1. The gaps in rows 21b, 21c, 21e and 21f are provided with vertically displaceable conveyors 12 having sets of rollers 13 displaceable radially as well as vertically by means of motors 11. The gap in the array 21c is provided with vertically non-displaceable sets of rollers 13'. At the station 7 there is provided a continuous conveyor 15 which rises on its inside reach and lowers at its outside reach past an access station 14.

At the control station the code for the desired article is entered and one of the vertical elevators or conveyors 10 is moved up level to it and then telescopes out to pick the desired article and its holder off the respective array. The conveyor of the train 21b can pick anything off the single layer of holders in array 21a or the outer layer of holders in row 21c. The conveyor in row 21c can pick a holder off the inner layer of the array 21b and the outer holder of the array 21c. Similarly the conveyor 12 on the array 21e can pick and article off any of the holders of the inner layer of row 21d and at the outer layer of array 21f. Finally the conveyor of the row 21f can service a single vertical row in array 21g and any on the inside of row 21e. Thus if an article is to be picked off one of the displaceable arrays 21b and 21e it is moved into alignment with one of the conveyors 12 of the fixed arrays and if something is to be picked off any of the fixed arrays the adjacent movable-array conveyor 12 is moved into juxtaposition with it. Once picked off the respective conveyor 12 lowers down to one of the four levels of rollers 13'' and the holder and its article are passed out and set onto one of the buckets of the conveyor 15 which then displaces it past the window 14 so that it can be removed. Such a system can have gaps instead of the conveyors 12, 13' and 15, so that an operator can merely walk into the arrangement and by appropriate radial walking through the gaps and angular displacement in the gaps with the respective arrays can gain access to any of the holders.

It will be understood that each of the elements described above, or two or more together, may also find a useful application in other types of systems differing from the types described above.

While the invention has been illustrated and described as embodied in a storage and retrieval system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A storage and retrieval system for articles, comprising: a plurality of annular tracks which are concentric about an axis with a radially innermost track and a radially outermost track; a like plurality of trains, each train including a coaxially located cylindrical shelf for supporting storage holders, all shelves being uniformly arranged in horizontal rows and vertical columns, and each train being rotatable on a corresponding track and having a vertical gap to provide a radially directed access aisle extending to the axis when all gaps are radially aligned with each other; a stationary cylindrical shelf surrounding one of the trains and having a gap; a plurality of conveyors, each conveyor corresponding to one of the trains and being associated therewith and operating in a manner that each conveyor displaces corresponding storage holders along the columns and rows; an elevator movable along the access aisle; a plurality of drivers, each driver corresponding to and being associated with a corresponding one of the trains to enable the corresponding one of the trains to rotate on a corresponding track; and a control coupled to the drivers and causing the trains to be driven to a predetermined angular positions with respect to the access aisle.

2. The system defined by claim 1, further including sets of storage holders arranged on each shelf in horizontal rows and vertical columns.

3. The system defined by claim 2, wherein each train includes an inner storage holder subgroup and an outer storage holder subgroup, the inner storage holder subgroup being accessible only from inside a respective track and the outer storage holder subgroup being accessible only from outside the respective track.

4. The system defined by claim 1, further including a stationary conveyor located in the access aisle and cooperating with the conveyor in each train.

* * * * *